(12) United States Patent
Gross et al.

(10) Patent No.: US 6,811,017 B1
(45) Date of Patent: Nov. 2, 2004

(54) EGG TRANSFER APPARATUS WITH CONVERGING-DIVERGING GUIDES THAT FACILITATE EVEN DISTRIBUTION OF EGGS ON A MOVING CONVEYOR

(75) Inventors: Edward W. Gross, Raleigh, NC (US); Sean M. Bryan, Raleigh, NC (US); Phillip N. Strayer, Apex, NC (US)

(73) Assignee: Embrex, Inc., Durham, NC (US)

( * ) Notice: Subject to any disclaimer, the term of this patent is extended or adjusted under 35 U.S.C. 154(b) by 0 days.

(21) Appl. No.: 10/408,908

(22) Filed: Apr. 8, 2003

(51) Int. Cl.[7] .............................................. B65G 47/12
(52) U.S. Cl. ..................... 198/453; 198/446; 198/447; 198/454; 198/455
(58) Field of Search ............................. 198/452–455, 198/443, 446, 447

(56) References Cited

U.S. PATENT DOCUMENTS

| | | | | |
|---|---|---|---|---|
| 2,164,676 A | * | 7/1939 | Kenelm et al. ............. 198/771 |
| 2,679,309 A | * | 5/1954 | Reading ..................... 198/446 |
| 2,791,315 A | * | 5/1957 | Chapman .................... 198/444 |
| 3,240,311 A | * | 3/1966 | Hofer et al. ................ 198/443 |
| 3,469,672 A | * | 9/1969 | Stutske et al. .............. 198/458 |
| 3,592,327 A | | 7/1971 | Koch et al. ................... 198/33 |
| 3,716,127 A | * | 2/1973 | Loeffler ...................... 198/446 |
| 3,910,233 A | | 10/1975 | Amburn ........................ 119/1 |
| 3,964,233 A | | 6/1976 | Thomas .......................... 53/26 |
| 4,105,398 A | * | 8/1978 | Disch et al. ................. 432/121 |
| 4,458,630 A | | 7/1984 | Sharma et al. .................. 119/1 |
| 4,623,059 A | * | 11/1986 | Agnew ......................... 198/452 |
| 4,901,861 A | | 2/1990 | Cicchelli ..................... 209/539 |
| 5,028,421 A | | 7/1991 | Fredericksen et al. ...... 424/85.2 |
| 5,314,056 A | * | 5/1994 | Davis et al. ................. 198/396 |
| 5,908,117 A | | 6/1999 | Stroman et al. ............. 209/639 |
| 5,918,726 A | | 7/1999 | Temmink ................. 198/418.6 |
| 5,937,995 A | * | 8/1999 | Hartness et al. ............ 198/445 |
| 6,244,214 B1 | | 6/2001 | Hebrank ....................... 119/6.8 |

* cited by examiner

Primary Examiner—Richard Ridley
(74) Attorney, Agent, or Firm—Myers Bigel Sibley & Sajovec

(57) ABSTRACT

An egg transfer apparatus is configured to distribute eggs substantially evenly with reduced breakage on a moving conveyor. The egg transfer apparatus includes a conveyor having opposite first and second ends, a pair of elongated members that extend along the direction of travel of the conveyor between the conveyor first and second ends, and a plurality of spaced-apart, diverging guides positioned downstream from the elongated members. Each elongated member includes opposite first and second end portions. The first end portions of the elongated members are in generally parallel, spaced-apart relationship, and the second end portions have an arcuate configuration and converge to define an opening therebetween through which eggs on the conveyor are conveyed. The diverging guides are positioned downstream from the opening and cause the eggs passing through the opening to be generally evenly distributed at the conveyor second end.

26 Claims, 3 Drawing Sheets

EGG TRANSFER APPARATUS WITH CONVERGING-DIVERGING GUIDES THAT FACILITATE EVEN DISTRIBUTION OF EGGS ON A MOVING CONVEYOR

FIELD OF THE INVENTION

The present invention relates generally to eggs and, more particularly, to apparatus for handling eggs.

BACKGROUND OF THE INVENTION

In poultry hatcheries and other egg processing facilities, eggs are handled and processed in large numbers. The term "processing" includes treating live eggs with medications, nutrients, hormones and/or other beneficial substances while the embryos are still in the egg (i.e., in ovo). In ovo injections of various substances into avian eggs have been employed to decrease post-hatch morbidity and mortality rates, increase the potential growth rates or eventual size of the resulting bird, and even to influence the gender determination of the embryo. Injection of vaccines into live eggs have been effectively employed to immunize birds in ovo. It is further desirable in the poultry industry to manipulate an embryo in ovo to introduce foreign nucleic acid molecules (i.e., to create a transgenic bird) or to introduce foreign cells (i.e., to create a chimeric bird) into the developing embryo.

In ovo injection of a virus may be utilized to propagate the particular virus for use in preparation of vaccines. Examples of substances that have been used for, or proposed for, in ovo injection include vaccines, antibiotics and vitamins. Examples of in ovo treatment substances and methods of in ovo injection, as well as apparatus for handling a plurality of eggs, are described in U.S. Pat. No. 4,458,630 to Sharma et al. and U.S. Pat. No. 5,028,421 to Fredericksen et al., which are incorporated herein by reference in their entireties.

Improved methods of injecting eggs containing an embryo may be used to remove samples from eggs, including embryonic and extra-embryonic materials. Further, for other applications it may be desirable to insert a sensing device inside an egg containing an embryo to collect information therefrom, for example, as described in U.S. Pat. No. 6,244,214 to Hebrank, which is incorporated herein by reference in its entirety.

In commercial hatcheries, eggs typically are held in setting flats during incubation. At a selected time, typically on the eighteenth day of incubation, the eggs are removed from an incubator. Unfit eggs (namely, dead eggs, rotted eggs, empties, and clear eggs) are identified and removed, live eggs are treated (e.g., inoculated) and then transferred to hatching baskets.

Conveyor belts are conventionally utilized to transport live eggs from one location to another before, during and/or after processing. Unfortunately, live eggs typically will not distribute evenly across a moving conveyor belt. Live eggs will often roll backwards, end-over-end, in the opposite direction of the moving conveyor belt. The lack of even distribution and backwards rolling of live eggs can cause difficulties at various processing apparatus. For example, eggs can become bunched together which may result in breakage. In addition, bunching can result in eggs being placed on top of other eggs on a conveyor, which may also cause breakage. Eggs rolling end-over-end can also "ride up" on other eggs which may also cause breakage.

SUMMARY OF THE INVENTION

In view of the above discussion, embodiments of the present invention provide an egg transfer apparatus that is configured to distribute eggs substantially evenly with reduced breakage on a moving conveyor. The egg transfer apparatus includes a conveyor having opposite first and second ends, a pair of elongated members that extend along the direction of travel of the conveyor between the conveyor first and second ends, and a plurality of spaced-apart, diverging guides positioned downstream from the elongated members.

The endless conveyor conveys eggs disposed thereon from the first end to the second end. Each elongated member includes opposite first and second end portions. The first end portions of the elongated members are in generally parallel, spaced-apart relationship, and the second end portions have an arcuate configuration and converge to define an opening therebetween through which eggs on the conveyor are conveyed. The diverging guides are positioned downstream from the opening and cause the eggs passing through the opening to be generally evenly distributed at the conveyor second end. According to embodiments of the present invention, the diverging guides and elongated members oscillate along the direction of movement of the conveyor to facilitate even distribution of eggs.

An egg handling system according to embodiments of the present invention includes an egg positioning apparatus that positions eggs in a predetermined orientation, an egg transfer apparatus operably associated with the egg positioning apparatus, and an egg lifting device operably associated with the egg transfer apparatus. The conveyor of the egg transfer apparatus is operably associated with the egg positioning apparatus.

The egg positioning apparatus is configured to orient and hold eggs in a predetermined position for processing (e.g., in ovo injection, etc.) and includes a plurality of chutes for receiving evenly distributed eggs from the conveyor of the egg transfer apparatus.

DETAILED DESCRIPTION OF THE INVENTION

Figure 1:
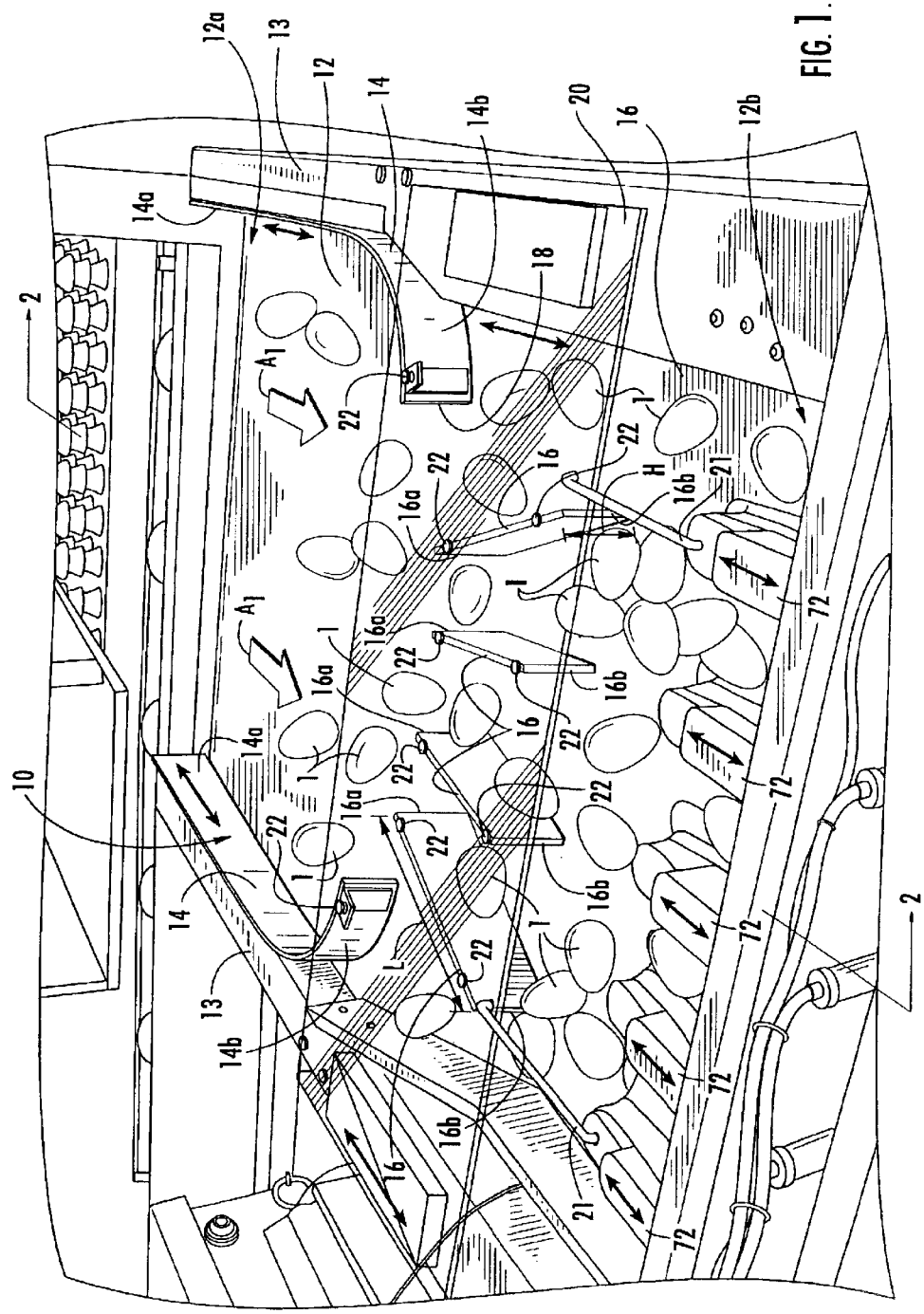
FIG. 1 is a perspective view of an egg handling system, including an egg transfer apparatus, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise.

All publications, patent applications, patents, and other references mentioned herein are incorporated by reference in their entirety.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

The present invention may be practiced with any type of avian egg, including, but not limited to, chicken, turkey, duck, goose, quail, and pheasant eggs.

Referring now to FIG. 1, an egg transfer apparatus 10 according to embodiments of the present invention is illustrated. The illustrated apparatus 10 includes an endless conveyor 12 having opposite first and second ends 12a, 12b, a pair of elongated members 14 that extend along the direction of travel (indicated by arrows $A_1$) of the conveyor 12 between the conveyor first and second ends 12a, 12b, and a plurality of spaced-apart, diverging guides 16 positioned downstream from the elongated members 14.

The endless conveyor 12 conveys eggs 1 disposed thereon from the first end 12a to the second end 12b. The term "conveyor" is intended to include any type of system for conveying eggs. Embodiments of the present invention are not limited to a particular type of conveyor (e.g., single, belt-driven conveyors). Conveyors according to embodiments of the present invention may utilize various types of drives and various types of conveying means (e.g., conveying belts, conveying platforms, etc.).

Each elongated member 14 includes opposite first and second end portions 14a, 14b. The first end portions 14a of the elongated members 14 are in generally parallel, spaced-apart relationship, as illustrated. The second end portions 14b of the elongated members 14 have an arcuate configuration and converge to define an opening 18 therebetween through which eggs 1 on the conveyor 12 are conveyed. The opening 18 typically will have a width of between about 12 inches and about 30 inches, although other widths are possible.

In the illustrated embodiment, the second end portions 14b of the elongated members 14 are secured to the panel 20 via fasteners 22 (e.g., bolts, screws, rivets, etc.). The elongated members 14 are elevated slightly above the conveyor 12 such that the conveyor can pass freely therebeneath. The elongated members 14 cause eggs (which are in a random/scattered pattern) on the conveyor first end 12a to become bunched together at opening 18. The elongated members 14 oscillate back and forth along the direction of movement $A_1$ of the conveyor, as will be described below.

The diverging guides 16 are positioned downstream from the opening 18. The diverging guides 16 are configured to cause eggs that are conveyed through the opening to be generally evenly distributed at the conveyor second end 12b. The diverging guides 16 are configured to oscillate back and forth along the direction of movement $A_1$ of the conveyor 12, as will be described below. The movement of the conveyor 12 along direction $A_1$, the oscillatory motion of the elongated members 14 and guides 16, and the diverging arrangement of the guides 16 all facilitate substantially even distribution of eggs at the conveyor second end 12b. Embodiments of the present invention do not require oscillatory movement of the elongated members 14 and guides 16, however.

Figure 3:
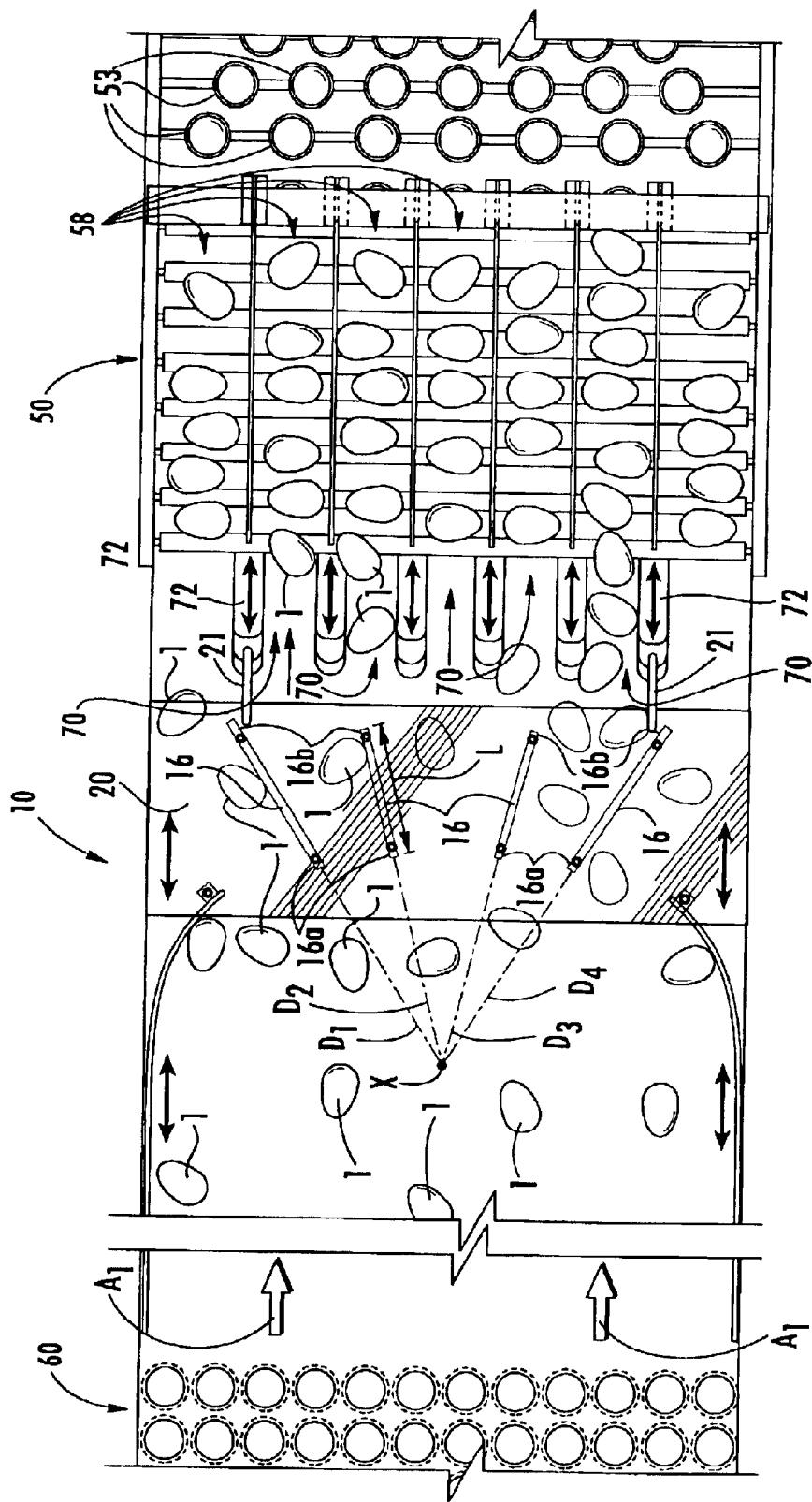
FIG. 3 is a top plan view of the egg handling system of FIG. 2, taken along lines 3—3.

The illustrated guides 16 have a substantially planar configuration, and each guide 16 extends along a respective direction $D_1$–$D_4$ (FIG. 3). The respective directions $D_1$–$D_4$ generally converge at a location X is upstream from the opening 18 (FIG. 3). However, the respective directions $D_1$–$D_4$ need not converge at exactly the same location.

In the illustrated embodiment, a panel 20 overlies the conveyor 12 in face-to-face, spaced-apart relationship. The guides 16 are secured to the panel 20 via fasteners 22 (e.g., bolts, screws, rivets, etc.) and extend downwardly towards the conveyor 12 from the panel 20. The guides 16 are elevated slightly above the conveyor 12 such that the conveyor can pass freely therebeneath.

Each guide 16 has opposite first and second ends 16a, 16b. The first ends 16a of adjacent guides 16 are spaced apart between about 2 inches and about 4 inches, although they may be spaced apart by other dimensions, as well. The second ends 16b of adjacent guides 16 are spaced apart between about 5 inches and about 6 inches, although they may be spaced apart by other dimensions, as well. Each guide 16 has a height H of between about 2 inches and about 3 inches and a length L of between about 6 inches and about 8 inches. However, embodiments of the present invention are not limited to guides 16 having these dimensions. Guides 16 may have other heights and lengths, without limitation.

The panel 20 is configured to oscillate back and forth along the direction of movement $A_1$ of the conveyor 12, thereby causing the elongated members 14 and guides 16 to oscillate back and forth. Oscillatory motion may be virtually any amount. For chicken eggs an oscillatory motion of about 0.75 inch in each direction is typical. However, various amounts of oscillatory motion can be utilized. Embodiments of the present invention are not limited to a particular amount of oscillatory movement or frequency.

In the illustrated embodiment, panel 20 is connected to the outermost dividers 72 of the egg positioning apparatus 50 via rods 21. The panel 20 is caused to oscillate by the oscillatory motion of the dividers 72 separating the various chutes 70 of the egg positioning apparatus 50. However, embodiments of the present invention are not limited to the illustrated configuration. The elongated members 14 and guides 16 may be caused to oscillate separately or jointly via various methods. In addition, the panel 20 may have any of various shapes and configurations. Moreover, panel 20 may be replaced with one or more rods that extend across the conveyor 12.

Figure 2:
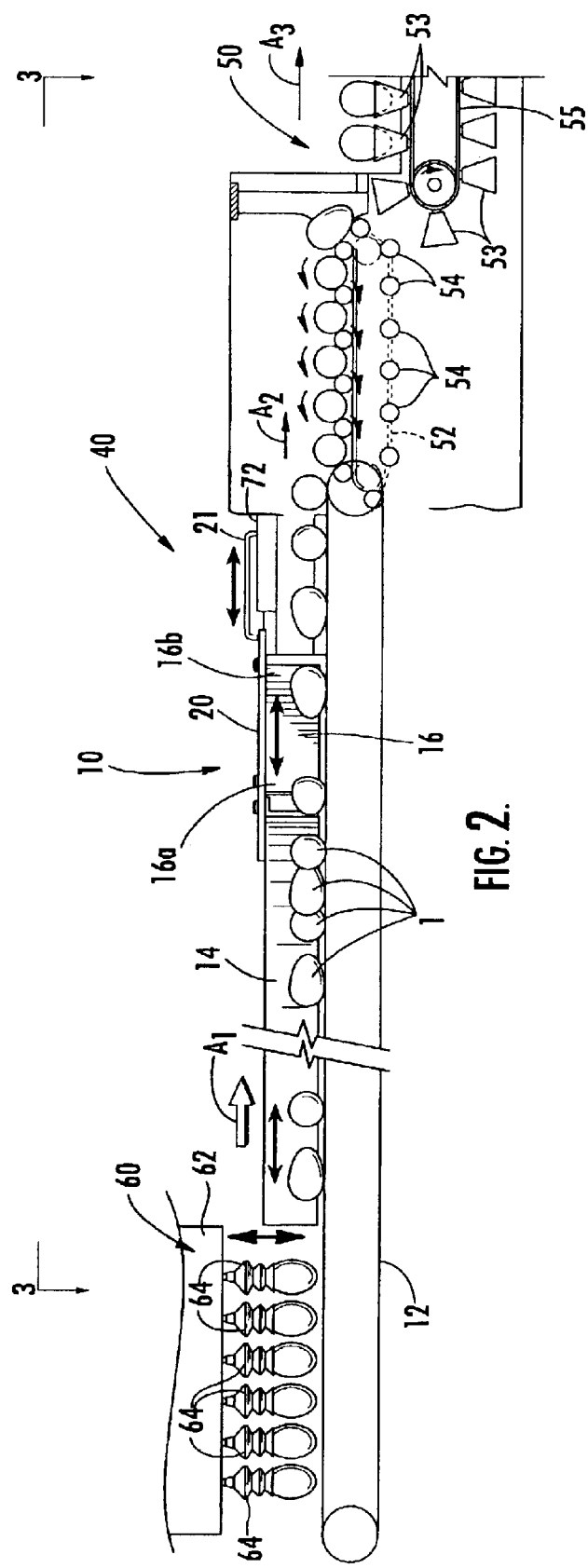
FIG. 2 is a side section view of the egg handling system of FIG. 1, taken along lines 2—2.

Referring now to FIGS. 2-3, an egg handling system 40, according to embodiments of the present invention, is illustrated and includes an egg positioning apparatus 50 that positions eggs in a predetermined orientation, an egg transfer apparatus 10 (as described above) operably associated with the egg positioning apparatus 50, and an egg lifting device 60 operably associated with the egg transfer apparatus 10. The conveyor 12 of the egg transfer apparatus 10 is operably associated with the egg positioning apparatus 50.

The egg positioning apparatus 50 is configured to orient and hold eggs in a predetermined position for processing (e.g., in ovo injection, etc.). The illustrated egg positioning apparatus 50 includes an endless conveyor 52 which has a plurality of parallel rollers 54 which are rotatably connected at their ends with a drive mechanism (e.g., chains, etc.). The rollers 54 move in the direction indicated by arrows $A_2$ while also rotating in the clockwise direction as viewed from FIG. 2. Under the effect of the movement and rotation of the rollers 54, eggs 1 travel along the direction indicated by arrow $A_2$ (with their narrow ends generally perpendicular to the direction of travel) and are fed into respective channels 58 and then into respective receiving cups 53 with their narrow ends pointing downwards. The receiving cups 53 are mounted on an endless conveyor system 55 that moves the cups 53 in the direction indicated by arrow $A_3$. An exemplary egg positioning apparatus 50 for use in combination with an egg transfer apparatus 10, according to embodiments of the present invention, is described in U.S. Pat. No. 3,592,327, which is incorporated herein by reference in its entirety. Each receiving cup 53 transports a respective egg 1 to a processing station 40, such as an INOVOJECT® brand automated injection system.

Egg positioning apparatus according to embodiments of the present invention may have various configurations, and are not limited to the illustrated embodiments. Egg positioning apparatus may include different numbers of channels and may include receiving cups of varying sizes and/or configurations. Moreover, various types of rollers and conveyor systems may be utilized with embodiments of the present invention without limitation.

The illustrated egg positioning apparatus 50 includes a plurality of chutes 70 for receiving eggs from the conveyor 12 of the egg transfer apparatus 10. The diverging guides 16 upstream from the chutes 70 maintain a generally even distribution of eggs 1 at the conveyor second end 12b, thereby reducing damage caused by bunching. The panel 20 is attached to two of the chute dividers 72 via rods 21, as illustrated. Oscillatory movement of the chute dividers 72 causes the panel 20, elongated members 14, and guides 16 to oscillate so as to facilitate substantially even distribution of eggs.

The illustrated egg lifting device 60 is operably associated with the conveyor 12 and is configured to simultaneously lift a plurality of eggs 1 and place them on the conveyor 12 adjacent the conveyor first end 12a. The illustrated egg lifting device 60 includes a lifting head 62 that has an array of manifold blocks and vacuum cups 64. The lifting head 62 is configured to lift a plurality of eggs 1 and place the eggs on the conveyor 12. Various types of egg lifting apparatus may be utilized in accordance with embodiments of the present invention. The present invention is not limited to the illustrated egg lifting apparatus.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An egg transfer apparatus, comprising:
    an endless conveyor having opposite first and second ends, wherein the conveyor conveys eggs disposed thereon from the first end to the second end;
    a pair of elongated members extending along the direction of travel of the conveyor between the conveyor first and second ends in adjacent, spaced-apart relationship, wherein each member includes opposite first and second end portions, and wherein the second end portions of the elongated members converge to define an opening therebetween through which eggs on the conveyor are conveyed; and
    a plurality of spaced-apart, diverging guides positioned downstream from the opening, wherein each guide extends along a respective direction, and wherein the respective directions converge at a location upstream from the opening, and wherein eggs conveyed through the opening and diverging guides are caused to be generally evenly distributed at the conveyor second end.

2. The egg transfer apparatus of claim 1, wherein the elongated members and diverging guides oscillate together along a direction of movement of the conveyor.

3. The egg transfer apparatus of claim 1, wherein the second end portions of the elongated members have an arcuate configuration.

4. The egg transfer apparatus of claim 1, wherein the first end portions of the elongated members are in generally parallel, spaced-apart relationship.

5. The egg transfer apparatus of claim 1, wherein the guides have a substantially planar configuration.

6. The egg transfer apparatus of claim 1, further comprising a panel overlying the conveyor in face-to-face, spaced-apart relationship therewith, and wherein the guides are secured to the panel and extend towards the conveyor from the panel.

7. The egg transfer apparatus of claim 1, wherein each guide has opposite first and second ends, wherein the first ends of adjacent guides are spaced apart between about 2 inches and about 4 inches, and wherein the second ends of adjacent guides are spaced apart between about 4 inches and about 6 inches.

8. The egg transfer apparatus of claim 1, wherein each guide has a height of between about 2 inches and about 3 inches and a length of between about 6 inches and about 8 inches.

9. The egg transfer apparatus of claim 1, wherein the opening is between about 17 inches and about 21 inches.

10. An egg handling system, comprising:
    an egg positioning apparatus that positions eggs in a predetermined orientation, wherein the egg positioning apparatus comprises a plurality of receptacles for receiving the eggs and a plurality of chutes for directing eggs in single-file order to the receptacles; and
    an egg transfer apparatus operably associated with the egg positioning apparatus, the egg transfer apparatus comprising:
        an endless conveyor having opposite first and second ends, wherein the conveyor conveys eggs disposed thereon from the first end to the second end;
        a pair of elongated members extending along the direction of travel of the conveyor between the conveyor first and second ends in adjacent, spaced-apart relationship, wherein each member includes opposite first and second end portions, and wherein the second end portions of the elongated members converge to define an opening therebetween through which eggs on the conveyor are conveyed; and
        a plurality of spaced-apart, diverging guides positioned downstream from the opening, wherein eggs conveyed through the opening and diverging guides are caused to be generally evenly distributed at the conveyor second end adjacent the chutes.

11. The egg handling system of claim 10, wherein the elongated members and diverging guides oscillate together along a direction of movement of the conveyor.

12. The egg handling system of claim 10, wherein the second end portions of the elongated members have an arcuate configuration.

13. The egg handling system of claim 10, wherein the first end portions of the elongated members are in generally parallel, spaced-apart relationship.

14. The egg handling system of claim 10, wherein each guide extends along a respective direction, and wherein the respective directions converge at a location upstream from the opening.

15. The egg handling system of claim 10, wherein the guides have a substantially planar configuration.

16. The egg handling system of claim 10, further comprising a panel overlying the conveyor in face-to-face, spaced-apart relationship therewith, and wherein the guides are secured to the panel and extend towards the conveyor from the panel.

17. The egg handling system of claim 10, wherein each guide has opposite first and second ends, wherein the first ends of adjacent guides are spaced apart between about 2 inches and about 4 inches, and wherein the second ends of adjacent guides are spaced apart between about 4 inches and about 6 inches.

18. The egg handling system of claim 10, wherein each guide has a height of between about 2 inches and about 3 inches and a length of between about 6 inches and about 8 inches.

19. The egg handling system of claim 10, wherein the opening is between about 17 inches and about 21 inches.

20. The egg handling system of claim 10, further comprising an egg lifting device operably associated with the conveyor, wherein the egg lifting device simultaneously lifts a plurality of eggs and places the plurality of eggs on the conveyor adjacent the conveyor first end.

21. The egg handling system of claim 10, wherein the conveyor comprises a variable speed conveyor.

22. An egg transfer apparatus, comprising:
an endless conveyor having opposite first and second ends, wherein the conveyor conveys eggs disposed thereon from the first end to the second end;
a pair of elongated members extending along the direction of travel of the conveyor between the conveyor first and second ends in adjacent, spaced-apart relationship, wherein each member includes opposite first and second end portions, and wherein the second end portions of the elongated members converge to define an opening therebetween through which eggs on the conveyor are conveyed; and
a plurality of spaced-apart, diverging guides positioned downstream from the opening, wherein the elongated members and diverging guides oscillate together along a direction of movement of the conveyor, and wherein eggs conveyed through the opening and diverging guides are caused to be generally evenly distributed at the conveyor second end.

23. An egg transfer apparatus, comprising:
an endless conveyor having opposite first and second ends, wherein the conveyor conveys eggs disposed thereon from the first end to the second end;
a pair of elongated members extending along the direction of travel of the conveyor between the conveyor first and second ends in adjacent, spaced-apart relationship, wherein each member includes opposite first and second end portions, and wherein the second end portions of the elongated members have an arcuate configuration and converge to define an opening therebetween through which eggs on the conveyor are conveyed; and a plurality of spaced-apart, diverging guides positioned downstream from the opening, wherein eggs conveyed through the opening and diverging guides are caused to be generally evenly distributed at the conveyor second end.

24. An egg transfer apparatus, comprising:
an endless conveyor having opposite first and second ends, wherein the conveyor conveys eggs disposed thereon from the first end to the second end;
a pair of elongated members extending along the direction of travel of the conveyor between the conveyor first and second ends in adjacent, spaced-apart relationship, wherein each member includes opposite first and second end portions, wherein the first end portions of the elongated members are in generally parallel, spaced-apart relationship, and wherein the second end portions of the elongated members converge to define an opening therebetween through which eggs on the conveyor are conveyed; and
a plurality of spaced-apart, diverging guides positioned downstream from the opening, wherein eggs conveyed through the opening and diverging guides are caused to be generally evenly distributed at the conveyor second end.

25. An egg transfer apparatus, comprising:
an endless conveyor having opposite first and second ends, wherein the conveyor conveys eggs disposed thereon from the first end to the second end;
a pair of elongated members extending along the direction of travel of the conveyor between the conveyor first and second ends in adjacent, spaced-apart relationship, wherein each member includes opposite first and second end portions, and wherein the second end portions of the elongated members converge to define an opening therebetween through which eggs on the conveyor are conveyed; and
a plurality of spaced-apart, diverging guides positioned downstream from the opening, wherein the guides have a substantially planar configuration, and wherein eggs conveyed through the opening and diverging guides are caused to be generally evenly distributed at the conveyor second end.

26. An egg transfer apparatus, comprising:
an endless conveyor having opposite first and second ends, wherein the conveyor conveys eggs disposed thereon from the first end to the second end;
a pair of elongated members extending along the direction of travel of the conveyor between the conveyor first and second ends in adjacent, spaced-apart relationship, wherein each member includes opposite first and second end portions, and wherein the second end portions of the elongated members converge to define an opening therebetween through which eggs on the conveyor are conveyed;
a plurality of spaced-apart, diverging guides positioned downstream from the opening, wherein eggs conveyed through the opening and diverging guides are caused to be generally evenly distributed at the conveyor second end; and
a panel overlying the conveyor in face-to-face, spaced-apart relationship therewith, wherein the guides are secured to the panel and extend towards the conveyor from the panel.

* * * * *